United States Patent
Mallapragada et al.

(10) Patent No.: US 12,235,911 B2
(45) Date of Patent: Feb. 25, 2025

(54) COMPUTER-BASED SYSTEMS AND METHODS FOR TRAINING AND USING A MACHINE LEARNING MODEL FOR IMPROVED PROCESSING OF USER QUERIES BASED ON INFERRED USER INTENT

(71) Applicant: Home Depot Product Authority, LLC, Atlanta, GA (US)

(72) Inventors: Srivatsa Mallapragada, Atlanta, GA (US); Ying Xie, Marietta, GA (US); Varsha Rani Chawan, Atlanta, GA (US); Zeyad Hailat, Atlanta, GA (US); Simon Hughes, Atlanta, GA (US); Yuanbo Wang, Austin, TX (US)

(73) Assignee: Home Depot Product Authority, LLC, Atlanta, GA (US)

( * ) Notice: Subject to any disclaimer, the term of this patent is extended or adjusted under 35 U.S.C. 154(b) by 0 days.

(21) Appl. No.: 18/239,791

(22) Filed: Aug. 30, 2023

(65) Prior Publication Data
US 2024/0152561 A1    May 9, 2024

Related U.S. Application Data

(60) Provisional application No. 63/424,946, filed on Nov. 13, 2022, provisional application No. 63/422,300, filed on Nov. 3, 2022.

(51) Int. Cl.
*G06F 16/9532* (2019.01)
*G06F 16/9535* (2019.01)

(52) U.S. Cl.
CPC ...... *G06F 16/9532* (2019.01); *G06F 16/9535* (2019.01)

(58) Field of Classification Search
CPC .......................... G06F 16/9532; G06F 16/9535
See application file for complete search history.

(56) References Cited

U.S. PATENT DOCUMENTS

| | | | |
|---|---|---|---|
| 11,720,942 B1 | 8/2023 | Loris | |
| 2017/0031904 A1* | 2/2017 | Legrand | G06F 16/904 |
| 2017/0357896 A1* | 12/2017 | Tsatsin | G06N 3/045 |
| 2018/0267976 A1* | 9/2018 | Bordawekar | G06F 16/3347 |

(Continued)

OTHER PUBLICATIONS

Gianni Amati and Cornelis Joost Van Rijsbergen. Probabilistic models of information retrieval based on measuring the divergence from randomness. ACM Transactions on Information Systems (TOIS), 20(4):357-389, 2002.

(Continued)

*Primary Examiner* — Jorge A Casanova
(74) *Attorney, Agent, or Firm* — Greenberg Traurig, LLP

(57) ABSTRACT

A method for providing document category recommendations may include training a machine learning algorithm; receiving, from a user, a selection of an anchor document; retrieving a user co-viewing sequence; generating, via the trained machine learning algorithm, a sequence embeddings set based on the anchor document and the user co-viewing sequence; comparing the generated embeddings set to respective embeddings for a plurality of candidate sets; determining the candidate set closest to the generated embeddings; and presenting at least one category from the closest candidate set.

20 Claims, 9 Drawing Sheets

(56) References Cited

U.S. PATENT DOCUMENTS

| | | | |
|---|---|---|---|
| 2018/0268024 A1* | 9/2018 | Bandyopadhyay | .... G06N 20/00 |
| 2020/0279105 A1 | 9/2020 | Muffat | |
| 2020/0410157 A1 | 12/2020 | Van De Kerkhof | |
| 2021/0149980 A1 | 5/2021 | Pavlini | |
| 2022/0179871 A1 | 6/2022 | Ahmed | |

OTHER PUBLICATIONS

Hamed Bonab, Mohammad Aliannejadi, Ali Vardasbi, Evangelos Kanoulas, and James Allan. Cross-market product recommendation. In Proceedings of the 30th ACM International Conference on Information & Knowledge Management. ACM, 2021.

Min Cao, Shiping Li, Juntao Li, Liqiang Nie, and Min Zhang. Image-text retrieval: A survey on recent research and development. arXiv preprint arXiv:2203.14713, 2022.

Wei-Cheng Chang, Felix X Yu, Yin-Wen Chang, Yiming Yang, and Sanjiv Kumar. Pre-training tasks for embedding-based large-scale retrieval. arXiv preprint arXiv:2002.03932, 2020.

Yen-Chun Chen, Linjie Li, Licheng Yu, Ahmed El Kholy, Faisal Ahmed, Zhe Gan, Yu Cheng, and Jingjing Liu. Uniter: Universal image-text representation learning. In European conference on computer vision, pp. 104-120. Springer, 2020.

Yen-Chun Chen, Linjie Li, Licheng Yu, Ahmed El Kholy, Faisal Ahmed, Zhe Gan, Yu Cheng, and Jingjing Liu. Uniter: Universal image-text representation learning. In Andrea Vedaldi, Horst Bischof, Thomas Brox, and Jan-Michael Frahm, editors, Computer Vision— ECCV 2020, pp. 104-120, Cham, 2020. Springer International Publishing.

Jia Deng, Wei Dong, Richard Socher, Li-Jia Li, Kai Li, and Li Fei-Fei. Imagenet: A large-scale hierarchical image database. In 2009 IEEE conference on computer vision and pattern recognition, pp. 248-255. Ieee, 2009.

Xiao Dong, Xunlin Zhan, Yangxin Wu, Yunchao Wei, Michael C Kampffmeyer, Xiaoyong Wei, Minlong Lu, Yaowei Wang, and Xiaodan Liang. M5product: Selfharmonized contrastive learning for e-commercial multimodal pretraining. In Proceedings of the IEEE/CVF Conference on Computer Vision and Pattern Recognition, pp. 21252-21262, 2022.

Alexey Dosovitskiy, Lucas Beyer, Alexander Kolesnikov, Dirk Weissenborn, Xiaohua Zhai, Thomas Unterthiner, Mostafa Dehghani, Matthias Minderer, Georg Heigold, Sylvain Gelly, et al. An image is worth 16×16 words: Transformers for image recognition at scale. arXiv preprint arXiv:2010.11929, 2020.

Patrick Esser, Robin Rombach, and Bjorn Ommer. Taming transformers for high-resolution image synthesis. In Proceedings of the IEEE/CVF conference on computer vision and pattern recognition, pp. 12873-12883, 2021.

Dehong Gao, Linbo Jin, Ben Chen, Minghui Qiu, Peng Li, Yi Wei, Yi Hu, and Hao Wang. Fashionbert: Text and image matching with adaptive loss for cross-modal retrieval. In Proceedings of the 43rd International ACM SIGIR Conference on Research and Development in Information Retrieval, pp. 2251-2260, 2020.

Mariya Hendriksen, Maurits Bleeker, Svitlana Vakulenko, Nanne van Noord, Ernst Kuiper, and Maarten de Rijke. Extending clip for category-to-image retrieval in e-commerce. In European Conference on Information Retrieval, pp. 289-303. Springer, 2022.

Jui-Ting Huang, Ashish Sharma, Shuying Sun, Li Xia, David Zhang, Philip Pronin, Janani Padmanabhan, Giuseppe Ottaviano, and Linjun Yang. Embedding-based retrieval in facebook search. In Proceedings of the 26th ACM SIGKDD International Conference on Knowledge Discovery & Data Mining, pp. 2553-2561, 2020.

Gautier Izacard, Mathilde Caron, Lucas Hosseini, Sebastian Riedel, Piotr Bojanowski, Armand Joulin, and Edouard Grave. Unsupervised dense information retrieval with contrastive learning. arXiv preprint arXiv:2112.09118, 2021.

Young Kyun Jang and Nam Ik Cho. Self-supervised product quantization for deep unsupervised image retrieval. In Proceedings of the IEEE/CVF International Conference on Computer Vision, pp. 12085-12094, 2021.

Chao Jia, Yinfei Yang, Ye Xia, Yi-Ting Chen, Zarana Parekh, Hieu Pham, Quoc Le, Yun-Hsuan Sung, Zhen Li, and Tom Duerig. Scaling up visual and vision-language representation learning with noisy text supervision. In International Conference on Machine Learning, pp. 4904-4916. PMLR, 2021.

Shubhra Kanti Karmaker Santu, Parikshit Sondhi, and ChengXiang Zhai. On application of learning to rank for ecommerce search. In Proceedings of the 40th international ACM SIGIR conference on research and development in information retrieval, pp. 475-484, 2017.

Makoto P. Kato, Takehiro Yamamoto, Hiroaki Ohshima, and Katsumi Tanaka. Cognitive search intents hidden behind queries: a user study on query formulations. In Proceedings of the 23rd International Conference on World Wide Web, pp. 313-314, 2014.

Omar Khattab and Matei Zaharia. Colbert: Efficient and effective passage search via contextualized late interaction over bert. In Proceedings of the 43rd International ACM SIGIR conference on research and development in Information Retrieval, pp. 39-48, 2020.

Lakshya Kumar and Sagnik Sarkar. Neural search: Learning query and product representations in fashion e-ommerce. arXiv preprint arXiv:2107.08291, 2021.

Junnan Li, Ramprasaath Selvaraju, Akhilesh Gotmare, Shafiq Joty, Caiming Xiong, and Steven Chu Hong Hoi. Align before fuse: Vision and language representation learning with momentum distillation. Advances in neural information processing systems, 34:9694-9705, 2021.

Jimmy Lin, Rodrigo Nogueira, and Andrew Yates. Pretrained transformers for text ranking: Bert and beyond. Synthesis Lectures on Human Language Technologies, 14(4):1-325, 2021.

Jiasen Lu, Dhruv Batra, Devi Parikh, and Stefan Lee. Vilbert: Pretraining task-agnostic visiolinguistic representations for vision-and-language tasks. Advances in neural information processing systems, 32, 2019.

Jiasen Lu, Vedanuj Goswami, Marcus Rohrbach, Devi Parikh, and Stefan Lee. 12-in-1: Multi-task vision and language representation learning. In Proceedings of the IEEE/CVF Conference on Computer Vision and Pattern Recognition, pp. 10437-10446, 2020.

Haoyu Ma, Handong Zhao, Zhe Lin, Ajinkya Kale, Zhangyang Wang, Tong Yu, Jiuxiang Gu, Sunav Choudhary, and Xiaohui Xie. Ei-clip: Entity-aware interventional contrastive learning for e-commerce cross-modal retrieval. In Proceedings of the IEEE/CVF Conference on Computer Vision and Pattern Recognition, pp. 18051-18061, 2022.

Priyanka Nigam, Yiwei Song, Vijai Mohan, Vihan Lakshman, Weitian Ding, Ankit Shingavi, Choon Hui Teo, Hao Gu, and Bing Yin. Semantic product search. In Proceedings of the 25th ACM SIGKDD International Conference on Knowledge Discovery & Data Mining, pp. 2876-2885, 2019.

Yiming Qiu, Chenyu Zhao, Han Zhang, Jingwei Zhuo, Tianhao Li, Xiaowei Zhang, Songlin Wang, Sulong Xu, Bo Long, and Wen-Yun Yang. Pre-training tasks for user intent detection and embedding retrieval in e-commerce search. arXiv preprint arXiv:2208.06150, 2022.

Alec Radford, Jong Wook Kim, Chris Hallacy, Aditya Ramesh, Gabriel Goh, Sandhini Agarwal, Girish Sastry, Amanda Askell, Pamela Mishkin, Jack Clark, et al. Learning transferable visual models from natural language supervision. In International Conference on Machine Learning, pp. 8748-8763. PMLR, 2021.

Ali Razavi, Aaron Van den Oord, and Oriol Vinyals. Generating diverse high-fidelity images with vq-vae-2. Advances in neural information processing systems, 32, 2019.

Nils Reimers and Iryna Gurevych. Sentence-bert: Sentence embeddings using siamese bert-networks. arXiv preprint arXiv:1908.10084, 2019.

Stephen Robertson, Hugo Zaragoza, et al. The probabilistic relevance framework: Bm25 and beyond. Foundations and Trends® in Information Retrieval, 3(4):333-389, 2009.

Victor Sanh, Lysandre Debut, Julien Chaumond, and Thomas Wolf. Distilbert, a distilled version of bert: smaller, faster, cheaper and lighter. arXiv preprint arXiv:1910.01108, 2019.

Keiji Shinzato, Naoki Yoshinaga, Yandi Xia, and Wei-Te Chen. Simple and effective knowledge-driven query expansion for qa-

(56) References Cited

OTHER PUBLICATIONS based product attribute extraction. In Proceedings of the 60th Annual Meeting of the Association for Computational Linguistics (vol. 2: Short Papers), pp. 227-234, 2022.

Riku Togashi and Tetsuya Sakai. Visual intents vs. clicks, likes, and purchases in e-commerce. In Proceedings of the 43rd International ACM SIGIR Conference on Research and Development in Information Retrieval, pp. 1869-1872, 2020.

Aaron van den Oord, Oriol Vinyals, et al. Neural discrete representation learning. Advances in neural information processing systems, 30, 2017.

Xiao Wang, Craig Macdonald, Nicola Tonellotto, and Iadh Ounis. Pseudo-relevance feedback for multiple representation dense retrieval. In Proceedings of the 2021 ACM SIGIR International Conference on Theory of Information Retrieval, pp. 297-306, 2021.

Lee Xiong, Chenyan Xiong, Ye Li, Kwok-Fung Tang, Jialin Liu, Paul Bennett, Junaid Ahmed, and Arnold Overwijk. Approximate nearest neighbor negative contrastive learning for dense text retrieval. arXiv preprint arXiv:2007.00808, 2020.

Peng Xu, Xiatian Zhu, and David A Clifton. Multimodal learning with transformers: A survey. arXiv preprint arXiv:2206.06488, 2022.

HongChien Yu, Chenyan Xiong, and Jamie Callan. Improving query representations for dense retrieval with pseudo relevance feedback. arXiv preprint arXiv:2108.13454, 2021.

Licheng Yu, Jun Chen, Animesh Sinha, Mengjiao Wang, Yu Chen, Tamara L Berg, and Ning Zhang. Commercemm: Large-scale commerce multimodal representation learning with omni retrieval. In Proceedings of the 28th ACM SIGKDD Conference on Knowledge Discovery and Data Mining, pp. 4433-4442, 2022.

Tan Yu, Junsong Yuan, Chen Fang, and Hailin Jin. Product quantization network for fast image retrieval. In Proceedings of the European Conference on Computer Vision (ECCV), pp. 186-201, 2018.

Jingtao Zhan, Jiaxin Mao, Yiqun Liu, Jiafeng Guo, Min Zhang, and Shaoping Ma. Learning discrete representations via constrained clustering for effective and efficient dense retrieval. In Proceedings of the Fifteenth ACM International Conference on Web Search and Data Mining, pp. 1328-1336, 2022.

Jingtao Zhan, Jiaxin Mao, Yiqun Liu, Min Zhang, and Shaoping Ma. Learning to retrieve: How to train a dense retrieval model effectively and efficiently. arXiv preprint arXiv:2010.10469, 2020.

Jingtao Zhan, Jiaxin Mao, Yiqun Liu, Min Zhang, and Shaoping Ma. Repbert: Contextualized text embeddings for first-stage retrieval. arXiv preprint arXiv:2006.15498, 2020.

Boxuan Zhang, Chao Wei, Yan Jin, and Weiru Zhang. Acebert: Adversarial cross-modal enhanced bert for e-commerce retrieval. arXiv preprint arXiv:2112.07209, 2021.

Mengxiao Zhang, Yongning Wu, Raif Rustamov, Hongyu Zhu, Haoran Shi, Yuqi Wu, Lei Tang, Zuohua Zhang, and Chu Wang. Advancing query rewriting in e-commerce via shopping intent learning. 2022.

Shengyu Zhang, Tan Jiang, Tan Wang, Kun Kuang, Zhou Zhao, Jianke Zhu, Jin Yu, Hongxia Yang, and Fei Wu. Devlbert: Learning deconfounded visio-linguistic representations. In Proceedings of the 28th ACM International Conference on Multimedia, pp. 4373-4382, 2020.

Ting Zhang and Jingdong Wang. Collaborative quantization for cross-modal similarity search. In Proceedings of the IEEE Conference on Computer Vision and Pattern Recognition, pp. 2036-2045, 2016.

Mingchen Zhuge, Dehong Gao, Deng-Ping Fan, Linbo Jin, Ben Chen, Haoming Zhou, Minghui Qiu, and Ling Shao. Kaleido-bert: Vision-language pre-training on fashion domain. In Proceedings of the IEEE/CVF Conference on Computer Vision and Pattern Recognition, pp. 12647-12657, 2021.

Hsiang-Fu Yu, Kai Zhong, Jiong Zhang, Wei-Cheng Chang and Inderjit S Dhillon. Pecos: Prediction for enormous and correlated output spaces. Journal of Machine Learning Research, 23(98):1-32, 2022.

International Search Report and Written Opinion of international application No. PCT/US2023/078474, dated Feb. 14, 2024, 11 pp.

Wei Wei, Chao Huang, Lianghao Xia, Yong Xu, Jiashu Zhao, Dawei Yin, Contrastive Meta Learning with Behavior Multiplicity for Recommendation, arXiv:2202.08523v1 Feb. 17, 2022.

\* cited by examiner

COMPUTER-BASED SYSTEMS AND METHODS FOR TRAINING AND USING A MACHINE LEARNING MODEL FOR IMPROVED PROCESSING OF USER QUERIES BASED ON INFERRED USER INTENT

CROSS-REFERENCE TO RELATED APPLICATION

This application claims the benefit of priority to U.S. provisional application No. 63/422,300, filed on Nov. 3, 2022, and to U.S. provisional application No. 63/424,946, filed on Nov. 13, 2022, the contents of which are hereby incorporated by reference in their entireties and for all purposes.

TECHNICAL FIELD

This disclosure generally relates to presentation of one or more recommended documents on an electronic interface, the documents recommended based on inferred user intent.

DETAILED DESCRIPTION

Figure 1:
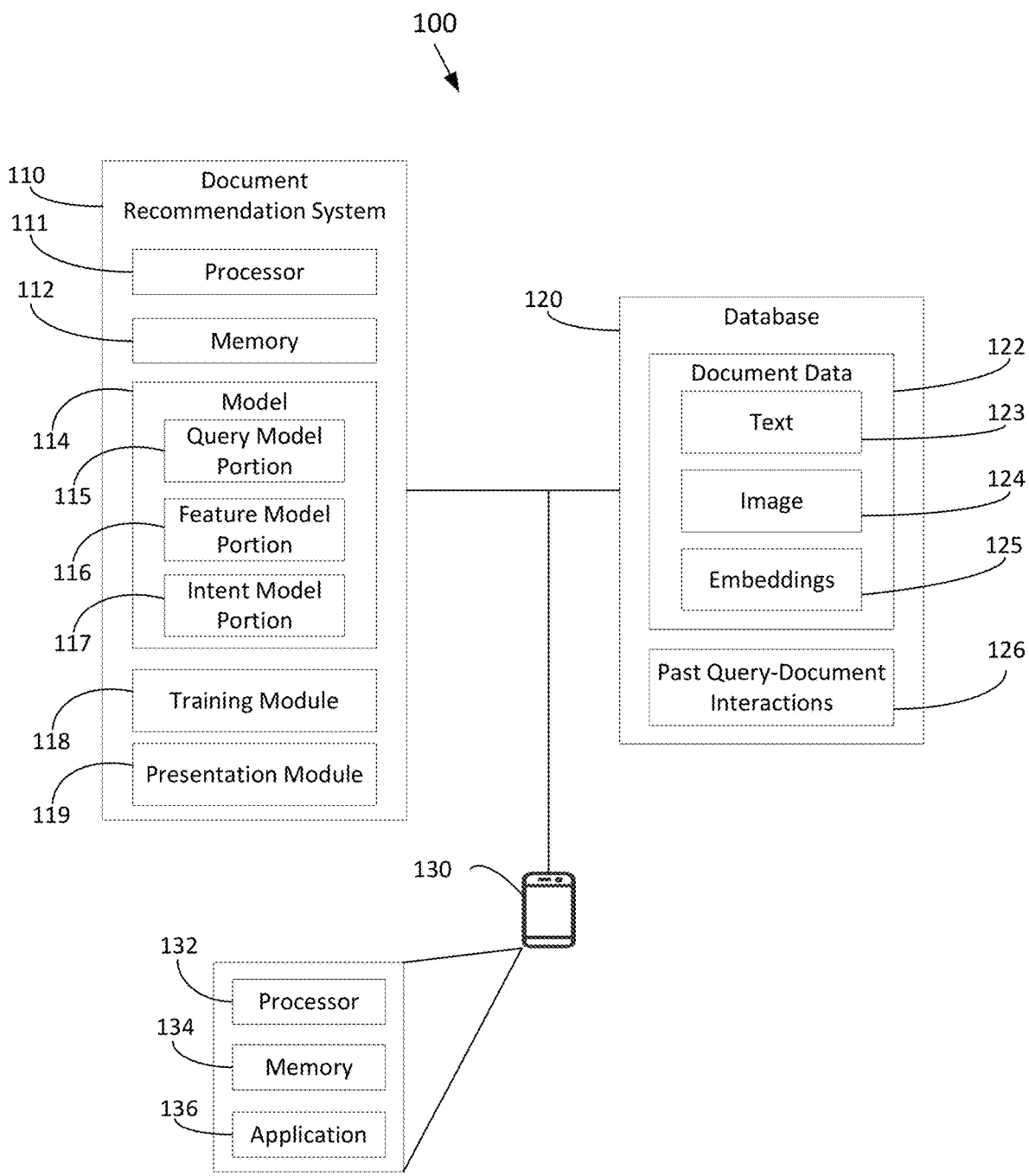
FIG. 1 is a block diagram of an example system for providing document recommendations.

Computerized devices with a user interface and/or display (e.g., smartphones, desktop computers, laptops, tablets, etc.) may be used by a user to search for information about a wide variety of things (e.g., via the Internet). In order to find the desired information, a user may enter queries or searches (e.g., text string, image, etc.) related to the information they are looking for. However, individual users may not all use the same wording to describe the desired information, and further may not use the same wording as a website or webpage that contains the desired information. Thus, serving the desired information to a user may be difficult where information retrieval methods and systems cannot properly interpret a user's intent (e.g., what the desired information is) based on the user query entered by the user. To reduce user friction if the user does not enter precise search terms and to improve relevancy of results returned to a user, the methods and systems herein describe training and using a machine learning model for improved processing of user queries based on inferred user intent. The systems and methods described herein may therefore serve better results to a user based on their query, even if the original query is broad, imprecise, uses informal language, etc.

The methods and systems described herein may be used for any type of queries, such as general search engine queries or any other type of searching where text based queries are used. Furthermore, the methods and systems described herein may be used to search for any type of items or other information. By training a model to recognize or infer user intent based on queries entered by users, the trained model may be used to determine or infer intent of a user based on a specific query entered by a user, which may be used to retrieve better search results for the user since their intent will be better understood based on their query.

As a result, retrieving and providing search results according to the techniques of the present disclosure solves an internet-centric problem—interpreting user queries and displaying search results with a website or other electronic user interface—through methods and systems necessarily rooted in computer technology. Additionally, the techniques described herein improve the functionality of a website accessed by a user and a computing device providing access to the website. As such, the methods and systems described herein may provide an improved graphical user interface (GUI). Displaying more relevant search results to a user is a demonstrable improvement that allows a user to quickly and easily, for example, view, select, unselect, add to a cart, purchase, and otherwise interact with information on an interface, such as a webpage. In other words, the methods and systems herein provide for a particular manner of summarizing and presenting information by and on electronic devices, and include specific manners of displaying a limited set of relevant information to a user, rather than using conventional search methods to display generic irrelevant information on a computer. In particular, the improved interfaces described herein may prevent a user from having to perform multiple queries and view voluminous results of those queries on more than one interface or webpage. This allows a user to see the most relevant data quickly, and saves the user from the time and hassle of navigating through multiple interfaces and webpages.

Referring to the drawings, wherein like reference numerals refer to the same or similar features in the various views, FIG. 1 is a block diagram of an example system 90 for providing document recommendations in response to a user query. The user query may be, for example, text entered through a physical or digital keyboard or voice-to-text software, audio spoken to a digital assistant (e.g., Google Home™, Amazon Alexa™, Apple Siri™), etc. For example, a product query may be received from a user through a voice search or request through an electronic user interface. The system 90 may include a document recommendation system 110, a database 120, and user computing device 130. Each of the document recommendation system 110, the database 120, and the user computing device 130 may be in electronic communication with one another and/or with other components via a network. The network may include any suitable connection (or combinations of connections) for transmitting data to and from each of the components of the system, and may include one or more communication protocols that dictate and control the exchange of data.

As shown, the document recommendation system 110 may include one or more functional modules 114, 118, and 119 embodied in hardware and/or software. In an embodiment, the functional modules 114, 118, and 119 of the document recommendation system 110 may be embodied in a processor 111 and a memory 112 (i.e., a non-transitory, computer-readable medium) storing instructions that, when executed by the processor 111, cause the document recommendation system 110 to perform the functionality of one or more of the functional modules 114, 118, and 119 and/or other functionality of this disclosure. For example, the document recommendation system 110 may provide a graphical user interface (GUI) for the user device 130 that may enable the user to interact with one or more functions of document recommendation system 110 via application 136.

The database 120 may be any suitable data storage location, and may store document data 122 and past query-document interactions 126. The document data 122 may include documents specific to or otherwise accessible through a particular electronic user interface, such as a website or mobile application. For example, in some embodiments, the documents may be respective of products and services offered through an e-commerce website (e.g., where each documents is respective of a given product or service), and the document data 122 may include a listing of these products and services. The document data 122 may include, for each document, text 123 and image 124 data. The text 123 of each document may be the text contained within the document itself, or text that may be descriptive of the document or of a feature(s) of the document. The image 124 of each document may be the image(s) contained within the document itself, or image(s) that may be descriptive of a feature(s) of the document. The document data 122 may also include document embeddings 125 for each document, and may have a document embeddings 125 in each of the text space and the image space, which correspond to the text 123 data and the image 124 data respectively. These document embeddings 125 may be generated by the model 114, or by any other suitable machine learning model.

The past query-document interactions 126 may include associated pairs of queries and documents responsive (or selected as a result of) the queries. For example, the interactions 126 may include a past query received from the user device 130 (or a similar user device), as well as a document (or documents) that were presented in response to the query and/or that were interacted with by the user device 130 subsequent to the query. These may include interactions (e.g., user navigations to, clicks on, or examinations of the documents), and/or user interactions with the products and services that are the subjects of those documents (e.g., purchases, additions to cart, etc.). An indication of the type of interaction (e.g., purchase, addition, navigation, search return, etc.) may be included in the interactions 126 data.

The functional modules 114, 118, and 119 of the document recommendation system 110 may include a machine learning model 114 that may be trained to receive a query and to provide at least one recommended document in response. The model 114 may include three portions: a query model portion 115, a feature model portion 116, and an intent model portion 117. Although each is described as a "portion" of the model 114 and the portions 115, 116, 117 may be part of a single cohesive model, in some embodiments, it should be understood that each of the query model portion, the feature model portion 116, and the intent model portion 117 may be unique and separate machine learning models, in some embodiments.

The input to the model 114 may be a query and the output may be a recommended document. Within the model 114, each portion may have its own input and its own output that collectively contribute to the overall output of the model 114. In particular, the query model portion 115 may be configured to receive, as input, the query and may output an embeddings indicative of the query. The feature model portion 116 may receive, as input, an embeddings indicative of a query and may output an embeddings indicative of a predicted feature responsive to the query. The intent model portion 117 may be configured to receive an embeddings indicative of a query and may output an embeddings indicative of a predicted intent of the query. The model 114 may be trained to process the outputs of the three portions—the query embeddings, the feature embeddings, and the intent embeddings—to generate an embeddings indicative of a document(s) responsive to the received query.

The functional modules 114, 118, and 119 of the document recommendation system 110 may include a training module 118 configured to train the model 114 or one or more portions of the model 114. In particular, the training module 118 may generate or receive training datasets for the model 114 from the database 120 and may iteratively train the model 114 (or one or more portions of the model 114) using the training datasets. In some embodiments, the training module 118 may employ a three-stage training process to train a portion (or portions) of the model 114, then using the trained portion(s) to train other portion(s). The three stages of training are described in greater depth below with reference to FIGS. 2-4.

The functional modules 114, 118, and 119 of the document recommendation system 110 may include a presentation module 119 configured to present the document recommended by the model 114 to the user device 130. In particular, the presentation module 119 may receive, from the model 114, the generated embeddings indicative of a responsive document and may determine a document to present based on the generated document embeddings. In some embodiments, the presentation module 119 may compare the generated document embeddings to a set of stored document embeddings 125 and may present the stored document embeddings similar to (e.g., closest to) the generated document embeddings. The set of stored document embeddings 125 may include an embeddings for each available document. For example, in those embodiments in which the documents are respective of products and services offered through an e-commerce website, each stored document embeddings 125 may be indicative of a particular product or service associated with the document. These stored document embeddings 125 may be pre-generated and stored (e.g., on the database 120), or may be determined by the model 114.

The presentation module 119 may present the responsive document(s) in conjunction with graphical control elements on the user device 130 that allow the user to pick different search terms. For example, the user interface may include one or more different inferred user intents from the intent model portion 117 (e.g., based on the output embeddings), such that the user can see how their search is being interpreted. Where more than one different inferred user intents is displayed, they may be ranked as most likely to be the user's intent to least likely, and the user device 130 may display responsive documents associated with the most likely intent by default. In various embodiments, the user may select other potential inferred intents displayed to display a different set of search results based on other possible inferred intents. Other graphical control elements on the interface may enable the user to select items in the search results, sort or filter the items in the search results, initiate a purchase of those items (e.g., adding to cart), complete a purchase (e.g., checking out, performing a 1-click purchase, etc.), etc., in embodiments.

The system 90 therefore advantageously provides more relevant search results to users on a website using inferred user intent and enables the users to find, select, learn about, purchase, etc. items with a reduced number of clicks. Instead of separately running several queries until a desired item is found, the system 90 provides a quicker way for the user to find information by. Furthermore, the system 90 reduces the number of pages to which a user may need to navigate, thereby reducing website server workload and improving website server functionality.

Figure 2:
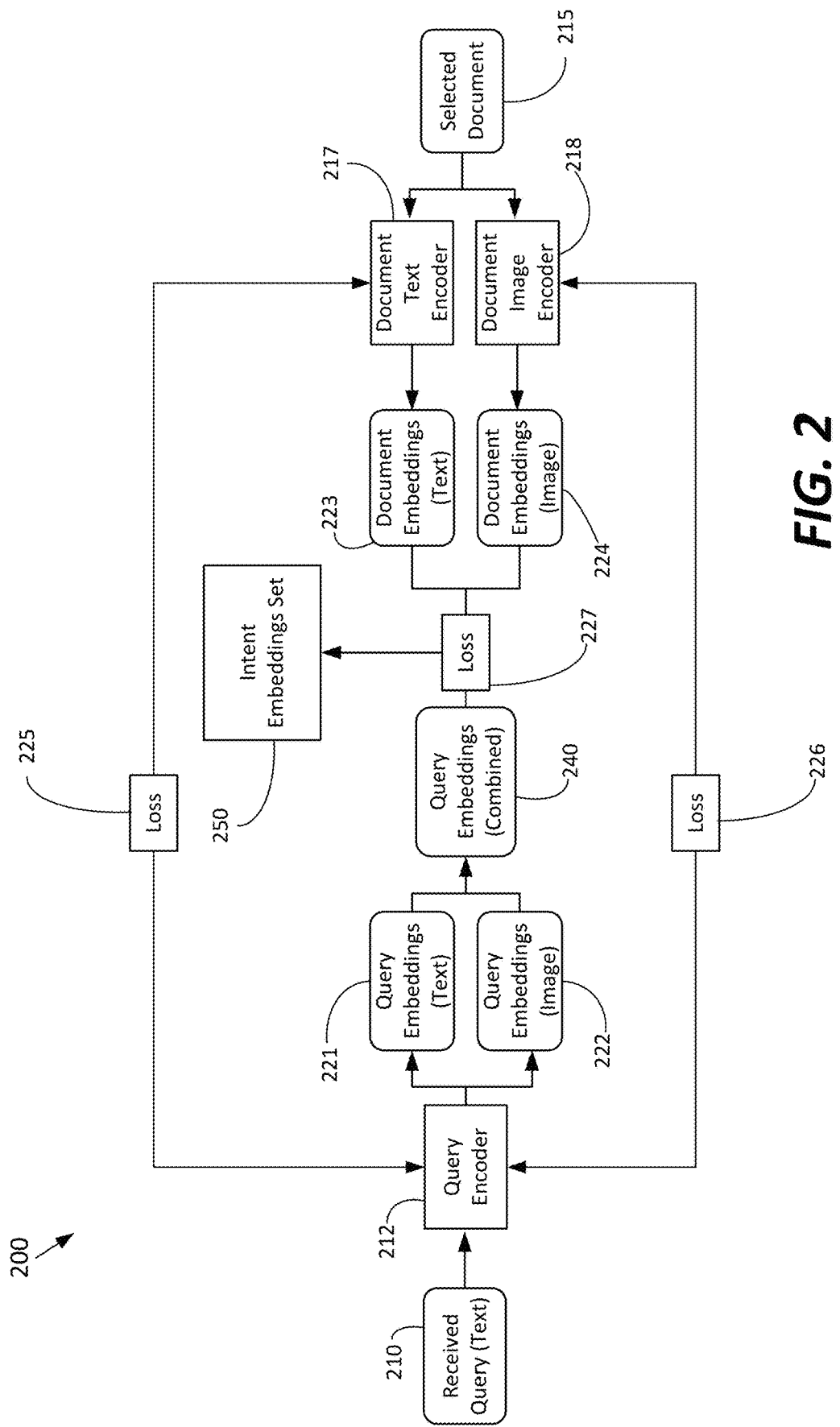
FIG. 2 is a flow chart of an example training step for a model of the system of FIG. 1.

FIG. 2 shows a flowchart for a process 200 of training the model 114 in a first stage. One or more steps or actions within the process 200 may be performed by the training module 118. The process 200 includes a query 210 from the set of past query-document interactions 126. The query 210 may be in text form (e.g., a string of characters), and may have been received via an interface on the user device 130. The query 210 may specify a document, a type of document, a feature, or other characteristic desired by a user of the user device 130. The query 210 may be input to a query encoder 212 configured to convert the query 210 into an embeddings vector indicative of the query 210. The query encoder 212 may be any suitable text encoder, such as a bidirectional encoder representations from transformers (BERT) or a distilled BERT (distillBERT). The query encoder 212 may be pre-trained using data similar to the documents stored in the database 120 or in the same field as the document in the database 120.

The output of the query encoder 212 may be projected into text and image spaces using a projection layer, which may take the output embeddings from the query encoder 212 (e.g., on a sub-word token basis for the query text 210) and generate embeddings in both the text space and the image space in order to align with document embeddings, which have embeddings in both spaces. In particular, the output embeddings form the query encoder 212 may.

Similarly, the document 215 may In those embodiments in which the past query-document interactions 126 include all interactions (e.g., including those that were unsuccessful or ended without a certain action), the process 200 may only utilize those past query-document interactions 126 in which the labels on the interactions indicate a successful interaction (e.g., a purchase, an add to cart, etc.) The document text encoder 217 may, similarly to the query encoder 212, be a BERT or a type of BERT (e.g., distillBERT). The document image encoder 218 may be vision transfer (ViT) pre-trained based on publicly available images with a 32×32 patch array for the image tokens. Because the document 215 may already contain an image (or images) associated with the underlying subject of the document 215, the document embeddings in the image space 224 may be generated by an image encoder directly rather than via projection of an embeddings into the image space.

The query embeddings 221 and the document embeddings 223 in the text space may be inputs to a text-based loss function 225, and the output of the loss function 225 may be used to train and/or adjust the query encoder 212 and the document text encoder 217. Similarly, the query embeddings 222 and the document embeddings 224 in the image space may be inputs to an image-based loss function 226, with an output of the loss function 226 used to train and/or adjust the query encoder 212 and the document image encoder 218. Accordingly, each of the query encoder 212, the document text encoder 217, and the document image encoder 218 may be trained and adjusted based on data retrieved from the database 120 regarding past query-document interactions 126, such that each encoder may be trained to generate embeddings that incorporate past query-document interactions 126.

As further shown in FIG. 2, query embeddings in the text space 221 and in the image space 222 may be combined (e.g., concatenated) into a single query embeddings 240 representative of the query 210. From there, the combined query embeddings 240, the document embeddings in the text space 223, and the document embeddings in the image space 224 may be used to determine and/or adjust a set of intent embeddings vectors 250. In particular, a third loss function 227 may be utilized, and may receive, as inputs, the combined query embeddings 240 and the document embeddings in the text space 223 and in the image space 224, with an output of the third loss function 227 used to train and/or adjust the intent embeddings set 250. In some embodiments, each intent embeddings of the set 250 may be generated using the input embeddings. In other embodiments, the set of intent embeddings 250 may be a pre-defined set of embeddings evenly- and uniformly-distributed across the vector space, and the set 250 may be adjusted (e.g., the values and positions of the intent embeddings may be changed) by the third loss function 227 (e.g., based on query embeddings 240, the document embeddings in the text space 223, and the document embeddings in the image space 224). In particular, the third loss function 227 may determine the mean of the combined query embeddings 240 and of the document embeddings (e.g., which may also be concatenated) may be calculated, and the intent embeddings 250 may be adjusted based a distance in the vector space between the mean embeddings and the intent embeddings 250 to draw the intent embeddings 250 closer to the mean embeddings. In this way, the intent embeddings 250 may approximate or quantify an intent of a respective query 210. Stated differently, the intent embeddings 250 may quantify the causal connection between the query and the respective document.

In some embodiments, the third loss function 227 may utilize a reinforcement learning approach in which a first of the intent embeddings 250 may be selected based on the concatenated query embeddings 240 and a second based on the document embeddings. The loss function 227 may then compare the two selected intent embeddings 250, and may assign a positive value if the selected intent embeddings 250 are the same (e.g., the query embeddings 240 and document embeddings lead to the same conclusion) and a negative value if the selected intent embeddings 250 are different.

Treating feature embeddings as separate from the document embeddings may enable the process 200 to disentangle features from respective documents in order to more directly generate results responsive to a query. Because the feature embeddings may be generalized away from entire documents, an association may be drawn between a feature and a query rather than from a query to a document that may include unnecessary or unintended features.

Figure 3:
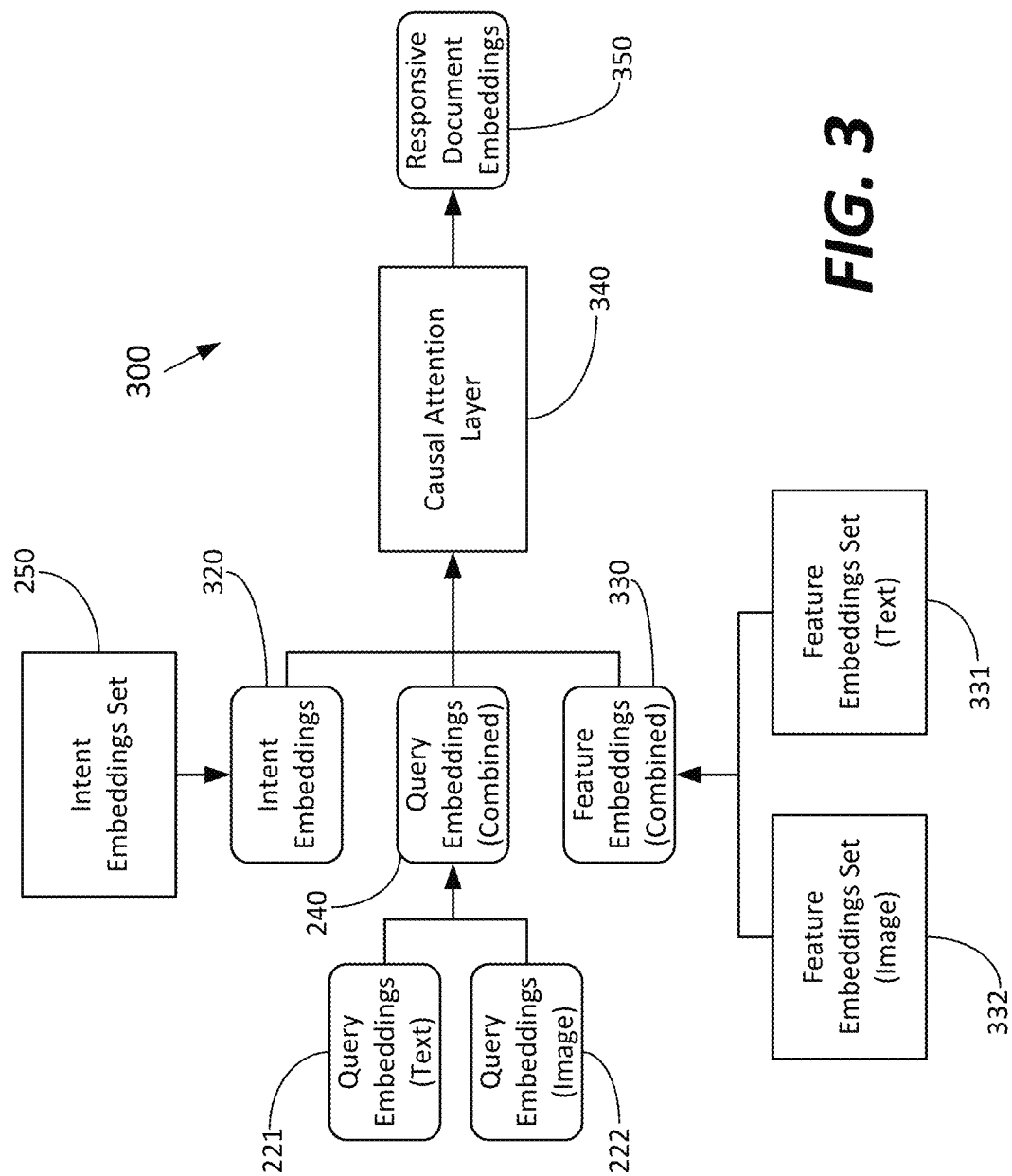
FIG. 3 is a flow chart of an example training step for a model of the system of FIG. 1.

FIG. 3 shows a flowchart for a process 300 of training the model 114 in a second stage. One or more steps or actions within the process 300 may be performed by the training module 118. As shown, the process 300 may utilize the intent embeddings set 250 generated in process 200, as well as feature embeddings set in the text space 331 and feature embeddings set in image space 332. As described above, each document 215 from the document data 222 may be associated with a product, service, or other similar subject, and each subject may include one or more features. Accordingly, the feature embeddings in the text space 331 and in the image space 332 may be indicative of these one or more features . . . . In particular, the process 300 may include retrieving an intent embeddings 320 from the intent embeddings set 250 and feature embeddings 330 derived from the feature embeddings sets in the text space 331 and the image space 332. The feature embeddings 330 may be a combined or concatenated embeddings to reflect both the text and image spaces. In some embodiments, multiple feature embeddings may be selected based on a single query embeddings (e.g., given that a single query may seek a document with multiple features), and the feature embeddings 330 may be a combination (e.g., concatenation) of the multiple feature embeddings. The particular intent embeddings 320 may be selected from the set 250 based on distance from the query embeddings 240, and may be determined using the intent model portion 117. Similarly, the feature embeddings 330 may be selected from the sets 331, 332 based on distance from the query embeddings and may be determined using the feature model portion 116.

Each of the query embeddings 240, the intent embeddings 320, and the feature embeddings 330 may be input into a causal attention layer 340, which may combine the embeddings into a single embeddings 350 indicative of a responsive document for the original query. The causal attention layer 340 may include a causal transfer with four layers, and each layer may include eight multi-attention heads with sixty-four internal working dimensions. The input to each layer may be the output of the previous layer, with the output of the final layer being the responsive document embeddings 350.

Accordingly, once trained, the model 114 may be configured to receive a query (e.g., from the user device 130) and may output a responsive document embeddings 350. The presentation module 119 may compare the responsive document embeddings 350 against a set of document embeddings representative of all available or accessible documents, and may select the document embeddings closest to the responsive document embeddings 350. The presentation module 119 may retrieve the document associated with the closest document embeddings, and may present the document on the user device 130 and, in particular, on a GUI of the user device 130. The presentation module 119 may include, as part of the presentation, one or more interactive elements that may enable the user to take one or more actions (e.g., purchase, review, read, select, add to cart, save, etc.) with regard to the presented document.

Figure 4:
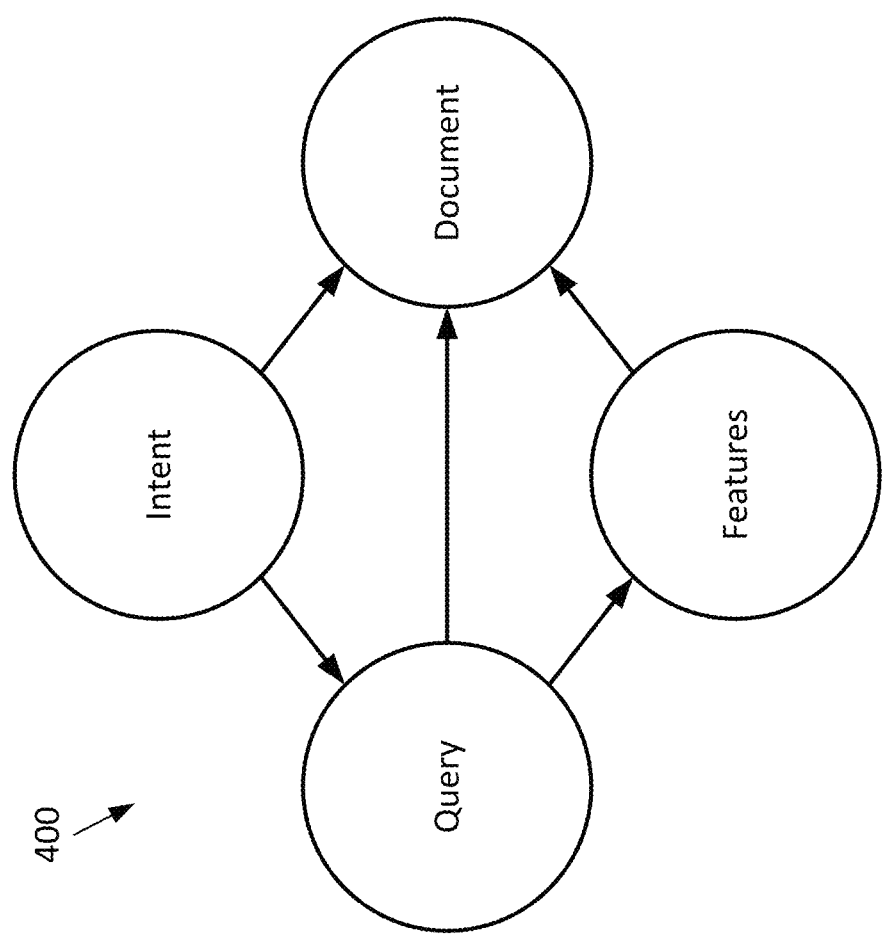
FIG. 4 is a diagram illustrating causal relationships utilized by the system of FIG. 1.

FIG. 4 is a diagram 400 illustrating causal relationships between the factors considered by the system 90. As shown, an intent of a user drives their query. The query determines the features, as well as—eventually— the responsive document itself. In turn, the intent and the features also affect the document. Accordingly, by reverse-engineering the intent from the query, and by deriving features from the query, the system 90 may determine a document responsive to the user's initial intent.

Figure 5:
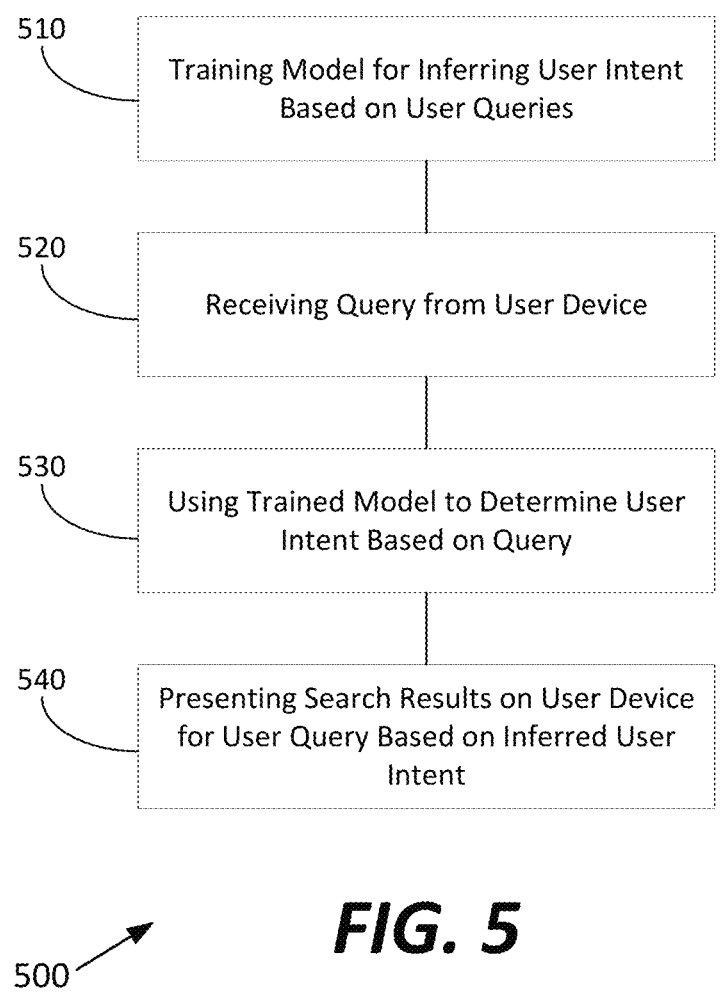
FIG. 5 is a flow chart illustrating an example method of providing document recommendations.

FIG. 5 is a method 500 of providing document recommendations. The method 500, or one or more portions of the method 500, may be performed by the system 90 and, in particular, the document recommendation system 110.

The method 500 may include, at block 510, training a model for inferring user intent based on user queries. The model trained at block 510 may be the model 114, or one or more portions of the model 114, and training the model at block 510 may include one or more of the training stages described above with reference to FIGS. 2-4. In some embodiments, the model may be trained to generate the embeddings 125 associated with the document data 122 stored on the database 120. In some embodiments, the model trained at block 510 may also be used to create a set of lookup tables that include user input queries cross-referenced to search results that should retrieved and/or provided to a user on a website for each possible user query in the lookup tables. In other words, the lookup tables 30 may cross-reference different potential user queries with one or more respective search results per user query in order to streamline the presentation of a recommended document.

The method 500 may include, at block 520, receiving a query from a user device. The query may be received, for example, by an application 136 on the user device 130, or through another electronic user interface such as a mobile application, fixed kiosk, etc. The query may be, for example, text entered through a physical or digital keyboard or voice-to-text software, audio spoken to a digital assistant (e.g., Google Home™, Amazon Alexa™, Apple Siri™), etc. For example, a query may be received from a user through a voice search or request through the electronic user interface.

In one embodiment, the application 136 with which the user interacts may be a mobile application, and the mobile application may be configured to capture voice search requests from the user. The user device 130 may be configured with voice recognition software to parse the user's voice search or voice request to determine a user query for which user intent should be inferred. In response to the voice search or voice request query, the document recommendation system 110 may infer a user intent to find and retrieve search results and provide those search results to the user through the application 136, as described herein.

In another embodiment, a query may be received from a user through a text-message-based (e.g., SMS or MMS) request. For example, the user may transmit a text message including a query from a user device 130 and, in response, the document recommendation system 110 may infer user intent and transmit search results based, in part, on the inferred intent to the user device 130.

The method 500 may also include, at block 530, using the trained model to determine user intent based on the query received at block 520. In particular, block 530 may utilize the intent model portion 117, which may receive an embeddings indicative of the query received at block 520 and retrieve an intent embeddings (e.g., from the intent embeddings set 250) closest to the query embeddings. In some embodiments, the intent model portion 117 may retrieve a top number of closest intent embeddings, or may retrieve all intent embeddings within a threshold distance of the query embeddings.

The method 500 may further include, at block 540, presenting search results on a computerized interface for the received user query based, in part, on inferred user intent. In some embodiments, the document recommendation system 110 may determine the "best" or "top" results (e.g., rank the documents), and present the documents in an order of most relevant to least relevant. Where the lookup tables are not used, for example, instead of using a lookup table or database of predetermined query and search result relationships, the document recommendation system 110 may determine a search results dynamically in response to a particular product query.

Figure 6:
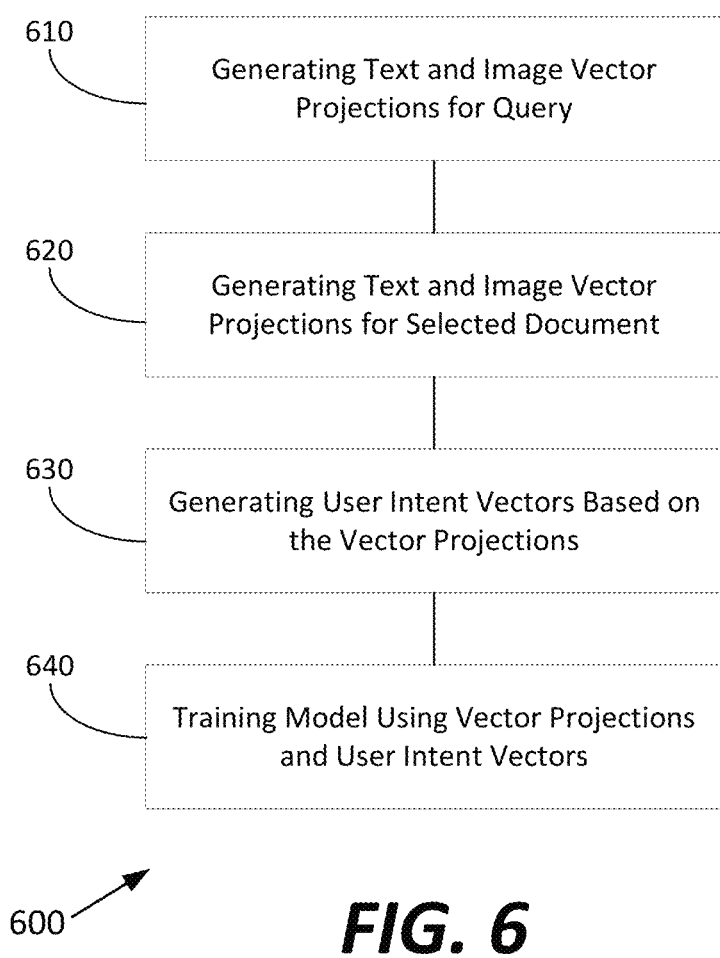
FIG. 6 is a flow chart illustrating an example method of providing document recommendations.

FIG. 6 is a method 600 of providing document recommendations. The method 600, or one or more portions of the method 600, may be performed by the system 90 and, in particular, the document recommendation system 110.

The method 600 may include, at block 610, generating vector projections in the text space and in the image space for a query and, at block 620, generating vector projections in the text space and in the image space for a document selected in response to the query. These pairs (e.g., a query and a respective document) may be retrieved from the past query-document interactions 126. The vector projections may be generated via any suitable text encoder and image encoder, such as query encoder 212, document text encoder 217, and document image encoder described above with reference to FIG. 2.

The method 600 may also include, at block 630, generating user intent vectors based on the vector projections from blocks 610 and 620. As described above with reference to the intent embeddings set 250 of FIG. 3, the intent embeddings may be generated, in some embodiments, from a zero starting point using the vector projections. In other embodiments, the intent embeddings may be a pre-defined set of embeddings evenly- and uniformly-distributed across the vector space, and the intent embeddings may be adjusted (e.g., the values and positions of the intent embeddings may be changed) based on the vector projections.

The method 600 may further include, at block 640, training a model using the vector projections from blocks 610 and 620 and using the intent vectors from block 630. This training may be performed, in part, using the third training stage 400 described in FIG. 4.

Figure 7:
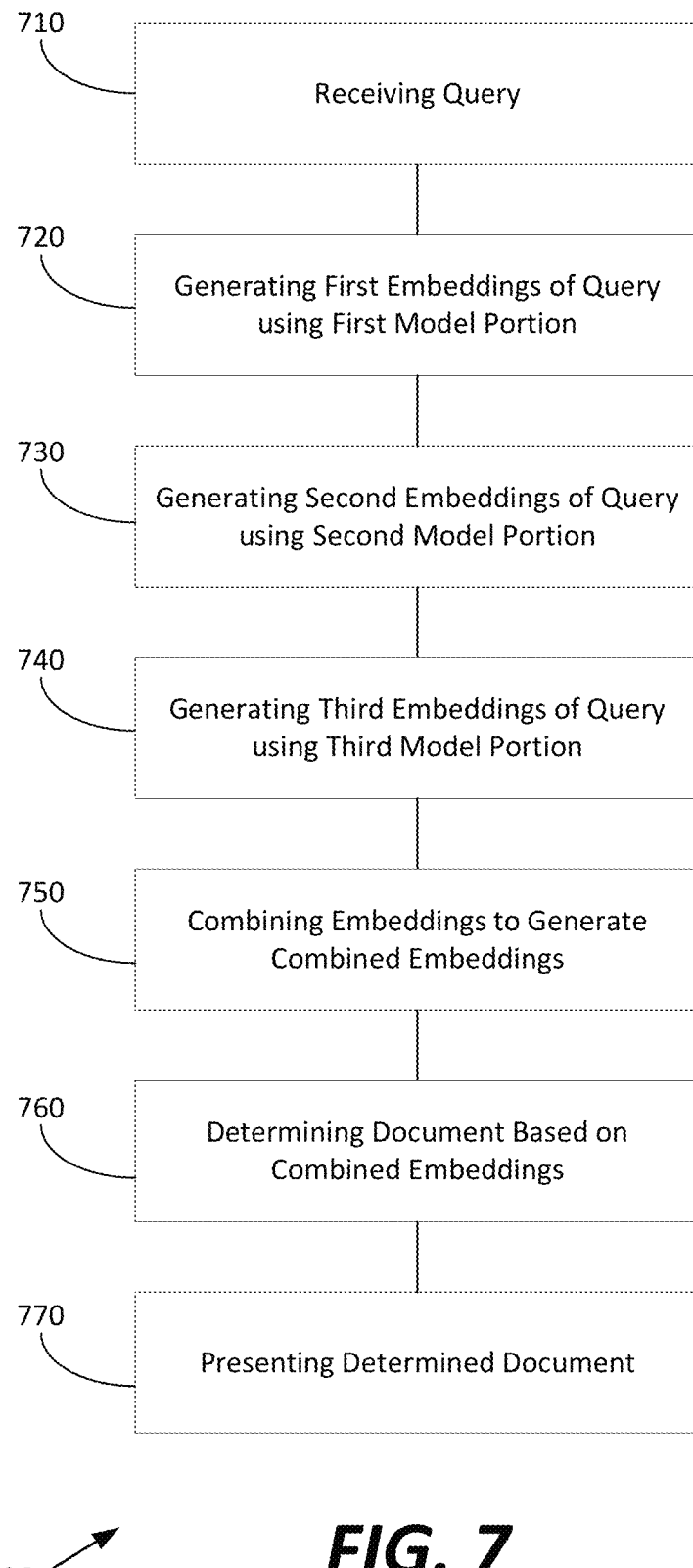
FIG. 7 is a flow chart illustrating an example method of providing document recommendations.

FIG. 7 is a method 700 of providing document recommendations. The method 700, or one or more portions of the method 700, may be performed by the system 90 and, in particular, the document recommendation system 110.

The method 700 may include, at block 710, receiving a query. The query may be received, for example, by the application 136 on the user device 130, or through another electronic user interface such as a mobile application, fixed kiosk, etc. The query may be, for example, text entered through a physical or digital keyboard or voice-to-text software, audio spoken to a digital assistant (e.g., Google Home™, Amazon Alexa™, Apple Siri™), etc. For example, a query may be received from a user through a voice search or request through the electronic user interface.

The method 700 may also include, at block 720, generating a first embeddings vector indicative of the query using a first machine learning model portion. The first embeddings vector may be indicative of a text of the query at a sub-token level, and the first machine learning model portion may be the query model portion 115.

The method 700 may also include, at block 730, generating a second embeddings vector indicative of the query using a second machine learning model portion. The second embeddings vector may be indicative of an intent of the query, and the second machine learning model portion may be the intent model portion 117.

The method 700 may also include, at block 740, generating a third embeddings vector indicative of the query using a third machine learning model portion. The third embeddings vector may be indicative of one or more features identified by or responsive to the query, and the third machine learning model portion may be the feature model portion 116.

The method 700 may also include, at block 750, combining the first, second, and third embeddings to generate a combined embeddings. The combined embeddings may be indicative of a document responsive to the query. In some embodiments, the combination may be a concatenation, such that the combined embeddings is a concatenated embeddings of the first, second, and third embeddings vectors. In some embodiments, the embeddings may be combined by processing the three embeddings in an multi-layer attention model (e.g., causal attention layer 340 of FIG. 4).

The method 700 may also include, at block 760, determining a document based on the combined embeddings. In particular, the combined embeddings may be compared to a set of document embeddings, and an embeddings from the set may be determined as a closest embeddings. In some embodiments, a single document embeddings may be determined as the single closest, and in other embodiments, multiple document embeddings may be determined as sufficiently close to (e.g., within a threshold distance from) the combined embeddings. From there, a document (or documents) associated with the closest embeddings may be determined as the document most-responsive to the query.

The method 700 may also include, at block 770, presenting the determined document. The determined document may be presented on the user device that initially provided the query at block 710, such that the presentation may be an interactive element on the application 136. In those embodiments in which multiple documents are determined at block 760, the presentation may present all determined documents, and may further rank the documents based on responsiveness (e.g., a relative closeness of each respective document embeddings to the combined embeddings).

Figure 8:
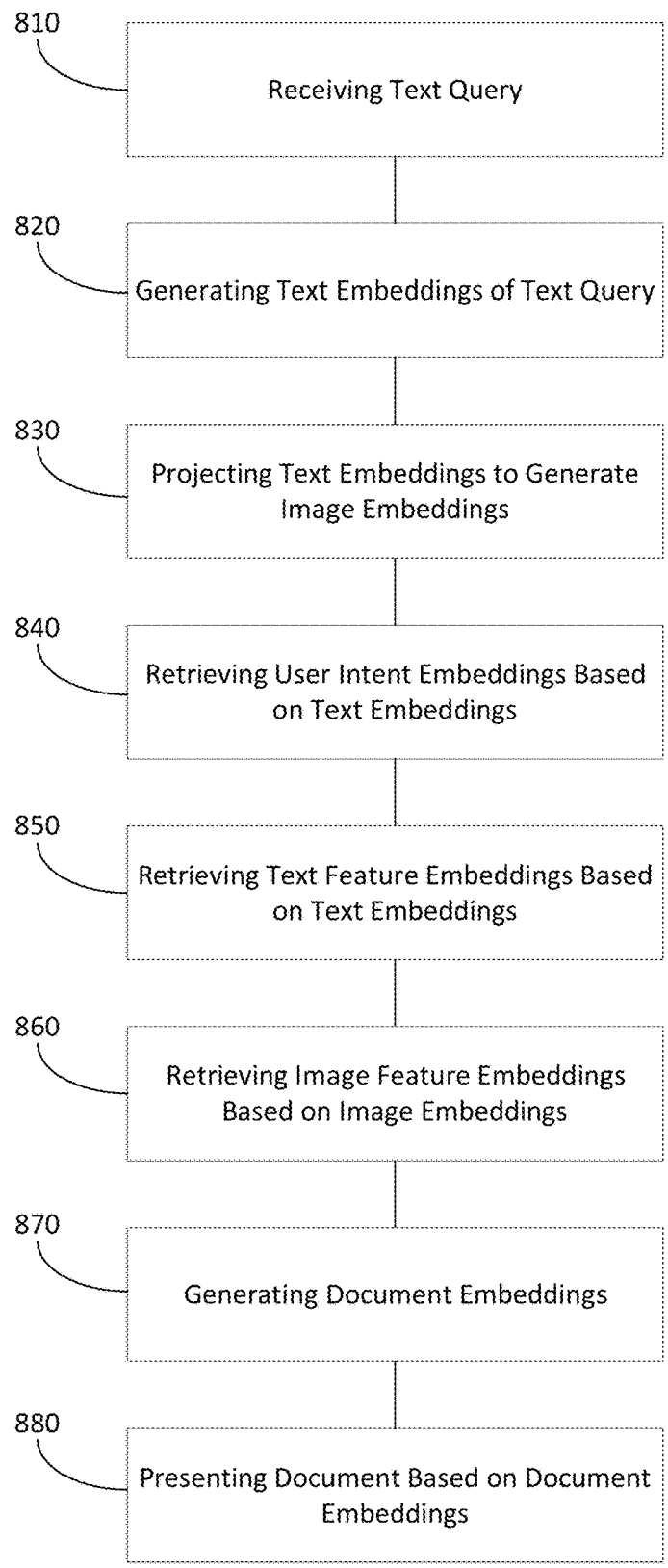
FIG. 8 is a flow chart illustrating an example method of providing document recommendations.

FIG. 8 is a method 800 of providing document recommendations. The method 800, or one or more portions of the method 800, may be performed by the system 90 and, in particular, the document recommendation system 110.

The method 800 may include, at block 810, receiving a text query. The query may be received, for example, by the application 136 on the user device 130, or through another electronic user interface such as a mobile application, fixed kiosk, etc. The query may be, for example, text entered through a physical or digital keyboard or voice-to-text software, audio spoken to a digital assistant (e.g., Google Home™, Amazon Alexa™, Apple Siri™), etc. For example, a query may be received from a user through a voice search or request through the electronic user interface.

The method 800 may also include, at block 820, generating a text embeddings vector indicative of the text query using a text encoder. The text encoder may be any suitable (e.g., and pre-trained) text encoder, such as query encoder 212.

The method 800 may also include, at block 830, generating an image embeddings vector indicative of the query by projecting the text embeddings into the image space. As described above with reference to the query embeddings in the image space 222, the query embeddings may be projected into the image space using an image encoder pre-trained on relevant data.

The method 800 may also include, at block 840, retrieving a user intent embeddings based on the text embeddings. The user intent embeddings vector may be indicative of an estimate intent (e.g., goal) of the user query, and may be retrieved from a set of intent embeddings (e.g., intent embeddings set 250) generated using one or more portions of the model 114.

The method 800 may also include, at block 850, retrieving a text feature embeddings based on the text embeddings and, at block 860, retrieving an image feature embeddings based on the query image embeddings. The text feature embeddings vector may be indicative of one or more features (e.g., in the text space) identified by and/or responsive to the text query, and may be retrieved from a set of feature embeddings (e.g., feature embeddings set 330) generated using one or more portions of the model 114. Similarly, the image embeddings vector may be indicative of one or more features (e.g., in the image space) identified by and/or responsive to the text query, and may be retrieved from a set of feature embeddings (e.g., feature embeddings set 330) generated using one or more portions of the model 114.

The method 800 may also include, at block 870, generating a document embeddings based on the text query embeddings, the image query embeddings, the user intent embeddings, the text feature embeddings, and the image feature embeddings. The document embeddings may be generated by concatenating each of these pre-cursor embeddings, and/or by inputting each of these embeddings into a multi-layer causal attention model (e.g., causal attention layer 340).

The method 800 may further include, at block 880, determining a document based on the document embeddings. In particular, the generated document embeddings may be compared to a set of document embeddings, and an embeddings from the set may be determined as a closest embeddings. From there, a document associated with the closest embeddings may be determined as the document most-responsive to the query. From there, the method 800 may present the determined document.

Figure 9:
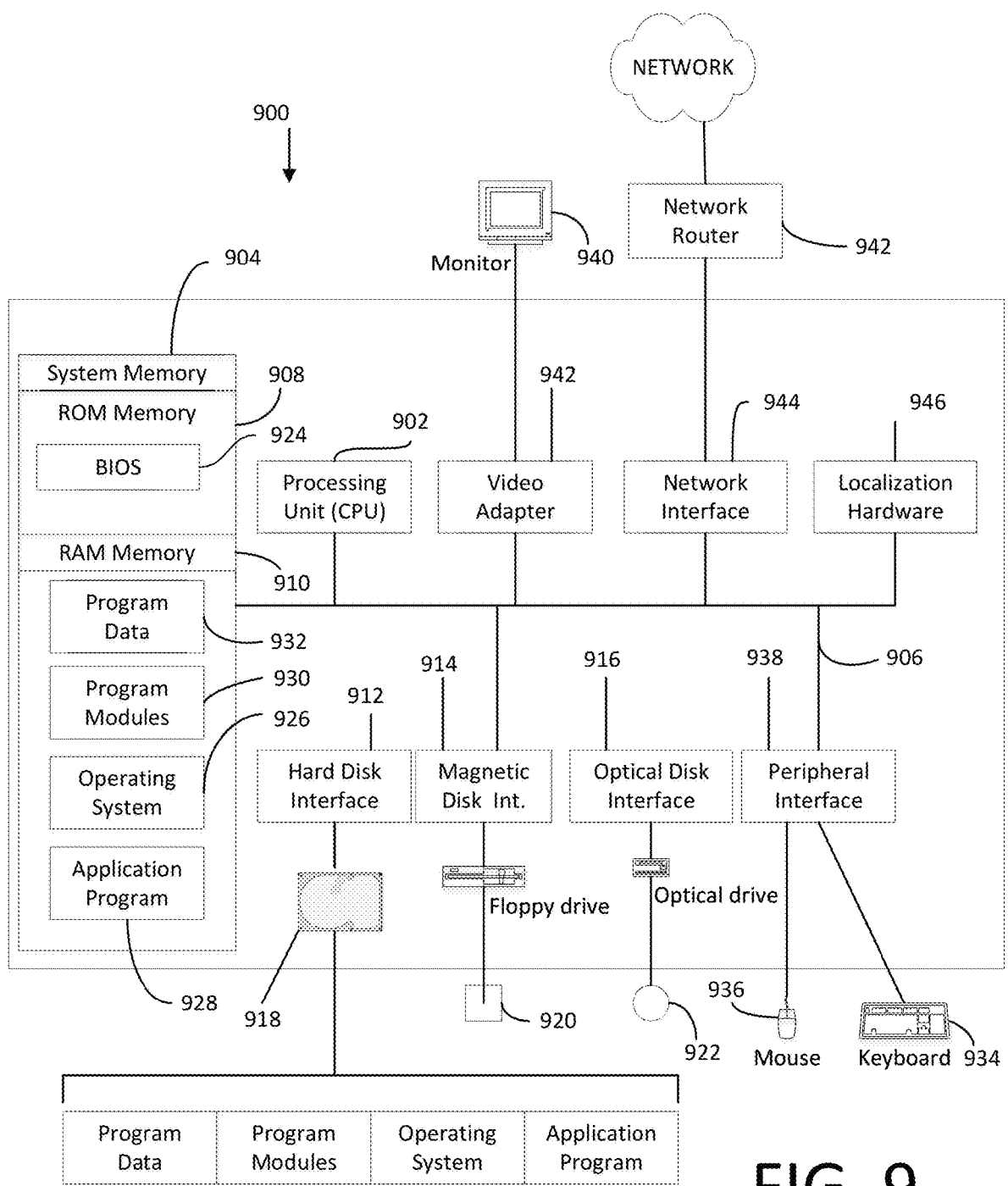
FIG. 9 is a diagrammatic view of an example user computing environment, according to some embodiments.

FIG. 9 is a diagrammatic view of an example embodiment of a user computing environment that includes a computing system environment 900, such as a desktop computer, laptop, smartphone, tablet, or any other such device having the ability to execute instructions, such as those stored within a non-transient, computer-readable medium. Furthermore, while described and illustrated in the context of a single computing system, those skilled in the art will also appreciate that the various tasks described hereinafter may be practiced in a distributed environment having multiple computing systems linked via a local or wide-area network in which the executable instructions may be associated with and/or executed by one or more of multiple computing systems.

In its most basic configuration, computing system environment 900 typically includes at least one processing unit 902 and at least one memory 904, which may be linked via a bus. Depending on the exact configuration and type of computing system environment, memory 904 may be volatile (such as RAM 910), non-volatile (such as ROM 908, flash memory, etc.) or some combination of the two. Computing system environment 900 may have additional features and/or functionality. For example, computing system environment 900 may also include additional storage (removable and/or non-removable) including, but not limited to, magnetic or optical disks, tape drives and/or flash drives. Such additional memory devices may be made accessible to the computing system environment 900 by means of, for example, a hard disk drive interface 912, a magnetic disk drive interface 914, and/or an optical disk drive interface 916. As will be understood, these devices, which would be linked to the system bus, respectively, allow for reading from and writing to a hard disk 918, reading from or writing to a removable magnetic disk 920, and/or for reading from or writing to a removable optical disk 922, such as a CD/DVD ROM or other optical media. The drive interfaces and their associated computer-readable media allow for the nonvolatile storage of computer readable instructions, data structures, program modules and other data for the computing system environment 900. Those skilled in the art will further appreciate that other types of computer readable media that can store data may be used for this same purpose. Examples of such media devices include, but are not limited to, magnetic cassettes, flash memory cards, digital video-disks, Bernoulli cartridges, random access memories, nano-drives, memory sticks, other read/write and/or read-only memories and/or any other method or technology for storage of information such as computer readable instructions, data structures, program modules or other data. Any such computer storage media may be part of computing system environment 900.

A number of program modules may be stored in one or more of the memory/media devices. For example, a basic input/output system (BIOS) 924, containing the basic routines that help to transfer information between elements within the computing system environment 900, such as during start-up, may be stored in ROM 908. Similarly, RAM 910, hard disk 918, and/or peripheral memory devices may be used to store computer executable instructions comprising an operating system 926, one or more applications programs 928 (which may include the functionality of the document recommendation system 110 of FIG. 1 or one or more of its functional modules 114, 118, or 119, for example), other program modules 930, and/or program data 932. Still further, computer-executable instructions may be downloaded to the computing environment 900 as needed, for example, via a network connection.

An end-user may enter commands and information into the computing system environment 900 through input devices such as a keyboard 934 and/or a pointing device 936. While not illustrated, other input devices may include a microphone, a joystick, a game pad, a scanner, etc. These and other input devices would typically be connected to the processing unit 902 by means of a peripheral interface 938 which, in turn, would be coupled to bus. Input devices may be directly or indirectly connected to processor 902 via interfaces such as, for example, a parallel port, game port, firewire, or a universal serial bus (USB). To view information from the computing system environment 900, a monitor 940 or other type of display device may also be connected to bus via an interface, such as via video adapter 942. In addition to the monitor 940, the computing system environment 900 may also include other peripheral output devices, not shown, such as speakers and printers.

The computing system environment 900 may also utilize logical connections to one or more computing system environments. Communications between the computing system environment 900 and the remote computing system environment may be exchanged via a further processing device, such a network router 942, that is responsible for network routing. Communications with the network router 942 may be performed via a network interface component 944. Thus, within such a networked environment, e.g., the Internet, World Wide Web, LAN, or other like type of wired or wireless network, it will be appreciated that program modules depicted relative to the computing system environment 900, or portions thereof, may be stored in the memory storage device(s) of the computing system environment 900.

The computing system environment 900 may also include localization hardware 956 for determining a location of the computing system environment 900. In embodiments, the localization hardware 956 may include, for example only, a GPS antenna, an RFID chip or reader, a WiFi antenna, or other computing hardware that may be used to capture or transmit signals that may be used to determine the location of the computing system environment 900.

The computing environment 900, or portions thereof, may comprise one or more components of the system 90 of FIG. 1, in embodiments.

In some embodiments, a computer-implemented method for document recommendation may include receiving a query from a user; generating, via a first trained machine learning model portion, a first embeddings vector representative of the query; generating, via a second trained machine learning model portion, a second embeddings vector representative of a feature of a potential document that may be responsive to the query; generating, via a third trained machine learning model portion, a third embeddings vector representative of an intent of the query; combining the first, second, and third embeddings vectors to generate a combined embeddings vector; determining a document from a plurality of documents based on the combined embeddings vector; and presenting the determined document. The first trained machine learning model portion may be trained using a text encoder, the second trained machine learning model portion may be trained using the text encoder and an image encoder, and the third trained machine learning model portion may be trained based on the first and second trained machine learning model portions.

In some of these embodiments, the first query embeddings vector may be representative of at least one of a text of the query or of a projected image of the query.

In some of these embodiments, the method further may include training the first machine learning model portion by retrieving a set of query-document interactions, each interaction including a past query and a text and an image of a past document responsive to the past query; generating, for each interaction and by the first trained machine learning model portion, a query embeddings vector; generating, for each interaction, a first document embeddings vector in a text vector space and a second document embeddings vector in an image vector space; and training the first trained machine learning model based on a loss function that uses the first document embeddings vector, the second document embeddings vector, and the query embeddings vector.

In some of these embodiments, the method further may include training the third machine learning model portion by quantizing a set of intent training embeddings vectors from a set of mean embeddings vectors for the set of query-document interactions, each mean embeddings vector determined based on the query embeddings vector, the first document embeddings vector, and the second document embeddings vector associated with a respective query-document interaction; generating, by the third trained machine learning model portion, an intent embeddings vector; retrieving, from the set of intent embeddings vectors, an intent training embeddings vector closest to the generated intent embeddings vector; and adjusting the third trained machine learning model portion based on a weighted distance between the retrieved intent training embeddings vector and the generated intent embeddings vector.

In some of these embodiments, the method further may include selecting a weight to adjust the trained third machine learning model portion closer to the retrieved intent training embeddings vector than to the generated intent embeddings vector and applying the selected weight to generate the weighted distance.

In some of these embodiments, the method further may include training the second machine learning model portion by quantizing a set of first feature training embeddings vectors from a set of first document embeddings vectors for the set of query-document interactions; quantizing a set of second feature training embeddings vectors from a set of second document embeddings vectors for the set of query-document interactions; generating, by the second trained machine learning model portion, a first feature embeddings vector and a second feature embeddings vector; and adjusting the second trained machine learning model portion based on a first distance between the first feature embeddings vector and a closest first feature training embeddings vector and on a second distance between the second feature embeddings vector and a closest second feature training embeddings vector.

In some of these embodiments, combining the first, second, and third embeddings vectors may include concatenating the first, second, and third embeddings vectors, and wherein the combined embeddings vector may include a concatenated embeddings vector.

In some of these embodiments, determining the document from the plurality of documents may include inputting the concatenated embeddings vector into a causal transformer model to generate an output embeddings vector; and determining the document as a closest document of the plurality of documents to the output embeddings vector.

In some embodiments, computer-implemented method for document recommendation may include receiving a text query; generating text embeddings representative of the text query;

projecting the text embeddings to generate image embeddings; retrieving user intent embeddings from a set of user intent embeddings based on the text embeddings; retrieving text feature embeddings from a set of text feature embeddings based on the text embeddings; retrieving image feature embeddings from a set of image feature embeddings based on the image embeddings; generating predicted document embeddings based on the text embeddings, the intent embeddings, the text feature embeddings, and the image feature embeddings; and presenting a document from a set of documents based on the predicted document embeddings.

In some of these embodiments, retrieving the intent embeddings may include retrieving a set of query-document interactions; generating, for each interaction, interaction query embeddings and interaction document embeddings; training an intent machine learning model based on a difference between an intent embeddings generated by the intent machine learning model and a closest mean embeddings of the interaction query embedding and the respective interaction document embeddings; and inputting the received text query embeddings into the trained intent machine learning model to generate the intent embeddings.

In some of these embodiments, retrieving the text feature embeddings and the image feature embeddings may include retrieving a set of query-document interactions; generating, for each interaction, an interaction text document embeddings and an interaction image document embeddings; determining a first difference between a text feature embeddings generated by a text feature machine learning model and each of the interaction text document embeddings; determining a second difference between an image feature embeddings generated by an image feature machine learning model and each of the interaction image document embeddings; training both the text feature machine learning model and the image feature machine learning model based on the first and second distances; and inputting the received text query embeddings into both the trained text feature machine learning model and the trained image feature machine learning model. A resultant output of the trained text feature machine learning model may be the retrieved text feature embeddings, and a resultant output of the trained image feature machine learning model may be the retrieved image feature embeddings.

In some of these embodiments, generating the predicted document embeddings may include:
concatenating the text feature embeddings and the image feature embeddings to generate feature embeddings;

concatenating the text embeddings, the intent embeddings, and the feature embeddings to generate concatenated query embeddings; and inputting the concatenated query embeddings to an attention-based transformer model. An output of the attention-based transformer model may include the predicted document embeddings.

In some embodiments, a system for document recommendation may include a processor; and computer-readable media storing instructions that, when executed by the processor, cause the system to receive a query from a user; generate, via a first trained machine learning model portion, a first embeddings vector representative of the query; generate, via a second trained machine learning model portion, a second embeddings vector representative of a feature of a potential document that may be responsive to the query; generate, via a third trained machine learning model portion, a third embeddings vector representative of an intent of the query; combine the first, second, and third embeddings vectors to generate a combined embeddings vector; determine a document from a plurality of documents based on the combined embeddings vector; and present the retrieved document. The first trained machine learning model portion may be trained using a text encoder, the second trained machine learning model portion may be trained using the text encoder and an image encoder, and the third trained machine learning model portion may be trained based on the first and second trained machine learning model portions.

In some of these embodiments, the first query embeddings vector may be representative of at least one of a text of the query or of a projected image of the query.

In some of these embodiments, the first trained machine learning model portion may be trained by retrieving a set of query-document interactions, each interaction may include a text of a past query and a text and an image of a past document corresponding to the past query; generating, for each interaction and by the first trained machine learning model portion, a query embeddings vector; generating, for each interaction, a first document embeddings vector in a text space and a second document embeddings vector in an image space; projecting, for each interaction, the query embeddings vector into the text space and into the image space; and training the first trained machine learning model based on a loss function that uses the first document embeddings vector, the second document embeddings vector, and the projected query embeddings vector.

In some of these embodiments, the system may be further configured to train the third machine learning model portion by quantizing a set of intent training embeddings vectors from a set of mean embeddings vectors for the set of query-document interactions, each mean embeddings vector determined based on the query embeddings vector, the first document embeddings vector, and the second document embeddings vector associated with a respective query-document interaction; generating, by the third trained machine learning model portion, an intent embeddings vector; retrieving, from the set of intent embeddings vectors, an intent training embeddings vector closest to the generated intent embeddings vector; and adjusting the third trained machine learning model portion based on a weighted distance between the retrieved intent training embeddings vector and the generated intent embeddings vector.

In some of these embodiments, the system may be further configured to select a weight to adjust the trained third machine learning model portion closer to the retrieved intent training embeddings vector than to the generated intent embeddings vector, and to apply the selected weight to generate the weighted distance.

In some of these embodiments, the system may be further configured to train the second machine learning model portion by quantizing a set of first feature training embeddings vectors from a set of first document embeddings vectors for the set of query-document interactions; quantizing a set of second feature training embeddings vectors from a set of second document embeddings vectors for the set of query-document interactions; generating, by the second trained machine learning model portion, a first feature embeddings vector and a second feature embeddings vector; and adjusting the second trained machine learning model portion based on a first distance between the first feature embeddings vector and a closest first feature training embeddings vector and on a second distance between the second feature embeddings vector and a closest second feature training embeddings vector.

In some of these embodiments, combining the first, second, and third embeddings vectors may include concatenating the first, second, and third embeddings, and wherein the combined embeddings vector may include a concatenated embeddings vector.

In some of these embodiments, determining the document from the plurality of documents may include inputting the concatenated embeddings vector into a causal transformer model to generate an output embeddings vector; and determining the document as a closest document of the plurality of documents to the output embeddings vector.

While this disclosure has described certain embodiments, it will be understood that the claims are not intended to be limited to these embodiments except as explicitly recited in the claims. On the contrary, the instant disclosure may be intended to cover alternatives, modifications and equivalents, which may be included within the spirit and scope of the disclosure. Furthermore, in the detailed description of the present disclosure, numerous specific details are set forth in order to provide a thorough understanding of the disclosed embodiments. However, it will be obvious to one of ordinary skill in the art that systems and methods consistent with this disclosure may be practiced without these specific details. In other instances, well known methods, procedures, components, and circuits have not been described in detail as not to unnecessarily obscure various aspects of the present disclosure.

Some portions of the detailed descriptions of this disclosure have been presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic data capable of being stored, transferred, combined, compared, and otherwise manipulated in a computer system or similar electronic computing device. For reasons of convenience, and with reference to common usage, such data is referred to as bits, values, elements, symbols, characters, terms, numbers, or the like, with reference to various presently disclosed embodiments. It should be borne in mind, however, that these terms are to be interpreted as referencing physical manipulations and quantities and are merely convenient labels that should be interpreted further in view of terms commonly used in the art. Unless specifically stated otherwise, as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers, or other such information storage, transmission, or display devices as described herein or otherwise understood to one of ordinary skill in the art.

What is claimed is:

1. A computer-implemented method for document recommendation comprising:
receiving a query from a user;
generating, via a first trained machine learning model portion, a first embeddings vector representative of the query;
generating, via a second trained machine learning model portion, a second embeddings vector representative of a predicted feature of a potential document from a feature embeddings set that is responsive to the first embeddings vector of the query;
generating, via a third trained machine learning model portion, a third embeddings vector representative of an intent of the query that is responsive to the first embeddings vector of the query;
combining the first, second, and third embeddings vectors to generate a combined embeddings vector;
determining a document from a plurality of documents based on the combined embeddings vector; and
presenting the determined document, wherein:
the first trained machine learning model portion is trained using a text encoder, the second trained machine learning model portion is trained using the text encoder and an image encoder, and
the third trained machine learning model portion is trained based on the first and second trained machine learning model portions.

2. The method of claim 1, wherein the first query embeddings vector is representative of at least one of a text of the query or of a projected image of the query.

3. The method of claim 1, further comprising training the first machine learning model portion by:
retrieving a set of query-document interactions, each interaction comprising a past query and a text and an image of a past document responsive to the past query;
generating, for each interaction and by the first trained machine learning model portion, a query embeddings vector;
generating, for each interaction, a first document embeddings vector in a text vector space and a second document embeddings vector in an image vector space; and
training the first trained machine learning model based on a loss function that uses the first document embeddings vector, the second document embeddings vector, and the query embeddings vector.

4. The method of claim 3, further comprising training the third machine learning model portion by:
quantizing a set of intent training embeddings vectors from a set of mean embeddings vectors for the set of query-document interactions, each mean embeddings vector determined based on the query embeddings vector, the first document embeddings vector, and the second document embeddings vector associated with a respective query-document interaction;
generating, by the third trained machine learning model portion, an intent embeddings vector;
retrieving, from the set of intent embeddings vectors, an intent training embeddings vector closest to the generated intent embeddings vector; and
adjusting the third trained machine learning model portion based on a weighted distance between the retrieved intent training embeddings vector and the generated intent embeddings vector.

5. The method of claim 4, further comprising selecting a weight to adjust the trained third machine learning model portion closer to the retrieved intent training embeddings vector than to the generated intent embeddings vector and applying the selected weight to generate the weighted distance.

6. The method of claim 3, further comprising training the second machine learning model portion by:
quantizing a set of first feature training embeddings vectors from a set of first document embeddings vectors for the set of query-document interactions;
quantizing a set of second feature training embeddings vectors from a set of second document embeddings vectors for the set of query-document interactions;
generating, by the second trained machine learning model portion, a first feature embeddings vector and a second feature embeddings vector; and
adjusting the second trained machine learning model portion based on a first distance between the first feature embeddings vector and a closest first feature training embeddings vector and on a second distance between the second feature embeddings vector and a closest second feature training embeddings vector.

7. The method of claim 1, wherein combining the first, second, and third embeddings vectors comprises concatenating the first, second, and third embeddings vectors, and wherein the combined embeddings vector comprises a concatenated embeddings vector.

8. The method of claim 7, wherein determining the document from the plurality of documents comprises:
inputting the concatenated embeddings vector into a causal transformer model to generate an output embeddings vector; and
determining the document as a closest document of the plurality of documents to the output embeddings vector.

9. A computer-implemented method for document recommendation comprising:
receiving a text query;
generating text embeddings representative of the text query;
projecting the text embeddings to generate image embeddings representative of a predicted feature from a feature embeddings set based on the text embeddings of the query;
retrieving user intent embeddings from a set of user intent embeddings based on the text embeddings of the query;
retrieving text feature embeddings from a set of text feature embeddings based on the text embeddings;

retrieving image feature embeddings from a set of image feature embeddings based on the image embeddings;

generating predicted document embeddings based on the text embeddings, the intent embeddings, the text feature embeddings, and the image feature embeddings; and presenting a document from a set of documents based on the predicted document embeddings.

10. The method of claim 9, wherein retrieving the user intent embeddings comprises:

retrieving a set of query-document interactions;

generating, for each interaction, interaction query embeddings and interaction document embeddings;

training an intent machine learning model based on a difference between an intent embeddings generated by the intent machine learning model and a closest mean embeddings of the interaction query embedding and the respective interaction document embeddings; and inputting the received text query embeddings into the trained intent machine learning model to generate the intent embeddings.

11. The method of claim 9, wherein retrieving the text feature embeddings and the image feature embeddings comprises:

retrieving a set of query-document interactions;

generating, for each interaction, an interaction text document embeddings and an interaction image document embeddings;

determining a first difference between a text feature embeddings generated by a text feature machine learning model and each of the interaction text document embeddings;

determining a second difference between an image feature embeddings generated by an image feature machine learning model and each of the interaction image document embeddings;

training both the text feature machine learning model and the image feature machine learning model based on the first and second differences; and inputting the received text query embeddings into both the trained text feature machine learning model and the trained image feature machine learning model, wherein a resultant output of the trained text feature machine learning model is the retrieved text feature embeddings, and a resultant output of the trained image feature machine learning model is the retrieved image feature embeddings.

12. The method of claim 9, wherein generating the predicted document embeddings comprises:

concatenating the text feature embeddings and the image feature embeddings to generate feature embeddings;

concatenating the text embeddings, the intent embeddings, and the feature embeddings to generate concatenated query embeddings; and inputting the concatenated query embeddings to an attention-based transformer model, wherein an output of the attention-based transformer model comprises the predicted document embeddings.

13. A system for document recommendation, the system comprising:

a processor; and a computer-readable media storing instructions that, when executed by the processor, cause the system to:

receive a query from a user;

generate, via a first trained machine learning model portion, a first embeddings vector representative of the query;

generate, via a second trained machine learning model portion, a second embeddings vector representative of a predicted feature of a potential document from a feature embeddings set based on the first embeddings vector that is responsive to the query;

generate, via a third trained machine learning model portion, a third embeddings vector representative of an intent of the query based on the first embeddings vector that is responsive to the query;

combine the first, second, and third embeddings vectors to generate a combined embeddings vector;

determine a document from a plurality of documents based on the combined embeddings vector; and present the retrieved determined document, wherein:

the first trained machine learning model portion is trained using a text encoder, the second trained machine learning model portion is trained using the text encoder and an image encoder, and the third trained machine learning model portion is trained based on the first and second trained machine learning model portions.

14. The system of claim 13, wherein the first query embeddings vector is representative of at least one of a text of the query or of a projected image of the query.

15. The system of claim 13, wherein the first trained machine learning model portion is trained by:

retrieving a set of query-document interactions, each interaction comprising a text of a past query and a text and an image of a past document corresponding to the past query;

generating, for each interaction and by the first trained machine learning model portion, a query embeddings vector;

generating, for each interaction, a first document embeddings vector in a text space and a second document embeddings vector in an image space;

projecting, for each interaction, the query embeddings vector into the text space and into the image space; and training the first trained machine learning model based on a loss function that uses the first document embeddings vector, the second document embeddings vector, and the projected query embeddings vector.

16. The system of claim 15, further configured to train the third machine learning model portion by:

quantizing a set of intent training embeddings vectors from a set of mean embeddings vectors for the set of query-document interactions, each mean embeddings vector determined based on the query embeddings vector, the first document embeddings vector, and the second document embeddings vector associated with a respective query-document interaction;

generating, by the third trained machine learning model portion, an intent embeddings vector;

retrieving, from the set of intent embeddings vectors, an intent training embeddings vector closest to the generated intent embeddings vector; and adjusting the third trained machine learning model portion based on a weighted distance between the retrieved intent training embeddings vector and the generated intent embeddings vector.

17. The system of claim 16, further configured to select a weight to adjust the trained third machine learning model portion closer to the retrieved intent training embeddings vector than to the generated intent embeddings vector, and to apply the selected weight to generate the weighted distance.

18. The system of claim 16, further configured to train the second machine learning model portion by:
- quantizing a set of first feature training embeddings vectors from a set of first document embeddings vectors for the set of query-document interactions;
- quantizing a set of second feature training embeddings vectors from a set of second document embeddings vectors for the set of query-document interactions;
- generating, by the second trained machine learning model portion, a first feature embeddings vector and a second feature embeddings vector; and
- adjusting the second trained machine learning model portion based on a first distance between the first feature embeddings vector and a closest first feature training embeddings vector and on a second distance between the second feature embeddings vector and a closest second feature training embeddings vector.

19. The system of claim 13, wherein combining the first, second, and third embeddings vectors comprises concatenating the first, second, and third embeddings, and wherein the combined embeddings vector comprises a concatenated embeddings vector.

20. The system of claim 19, wherein determining the document from the plurality of documents comprises:
- inputting the concatenated embeddings vector into a causal transformer model to generate an output embeddings vector; and
- determining the document as a closest document of the plurality of documents to the output embeddings vector.

* * * * *